(12) United States Patent
Stephens et al.

(10) Patent No.: US 6,936,665 B2
(45) Date of Patent: Aug. 30, 2005

(54) INTEGRATED ADVANCED CHEMICAL PROCESS CONTROL

(75) Inventors: William D. Stephens, Batavia, IL (US); Paul M. Halmo, Suwanee, GA (US)

(73) Assignee: BP Corporation North America Inc., Chicago, IL (US)

( * ) Notice: Subject to any disclaimer, the term of this patent is extended or adjusted under 35 U.S.C. 154(b) by 104 days.

(21) Appl. No.: 10/254,887

(22) Filed: Sep. 25, 2002

(65) Prior Publication Data

US 2003/0073787 A1 Apr. 17, 2003

Related U.S. Application Data

(60) Provisional application No. 60/325,012, filed on Sep. 26, 2001.

(51) Int. Cl.[7] .................................................. C08F 2/01
(52) U.S. Cl. ............................................ 526/65; 526/67
(58) Field of Search ....................................... 526/65, 67

(56) References Cited

U.S. PATENT DOCUMENTS

| | | | |
|---|---|---|---|
| 3,506,640 A | 4/1970 | Reid et al. | 260/94.9 |
| 3,759,820 A | 9/1973 | Boyd | 208/64 |
| 3,891,836 A | 6/1975 | Lee | 235/151.12 |
| 4,349,869 A | 9/1982 | Prett et al. | 364/159 |
| 4,448,736 A | 5/1984 | Emery | 264/40.1 |
| 4,469,853 A | 9/1984 | Mori | 526/59 |
| 4,616,308 A | 10/1986 | Morshedi et al. | 364/159 |
| 4,888,704 A | 12/1989 | Topliss | 364/500 |
| 5,155,184 A | 10/1992 | Laurent et al. | 526/59 |
| 5,387,659 A | 2/1995 | Hottovy et al. | 526/59 |
| 5,504,166 A | 4/1996 | Buchelli et al. | 526/60 |
| 5,644,007 A | 7/1997 | Davidson et al. | 526/64 |
| 5,684,580 A | 11/1997 | Cooper et al. | 356/301 |
| 5,830,954 A | 11/1998 | Hayashi et al. | 526/60 |
| 5,877,954 A | 3/1999 | Klimasauskas et al. | 364/149 |
| 5,933,345 A | 8/1999 | Martin et al. | 364/164 |
| 6,122,555 A | 9/2000 | Lu | 700/9 |

FOREIGN PATENT DOCUMENTS

| | | | | |
|---|---|---|---|---|
| EP | 0486262 A1 | | 5/1992 | ............. C08F/2/00 |
| WO | 9526990 A1 | | 10/1995 | ............ C08F/10/00 |
| WO | 9641822 A1 | | 12/1996 | ............ C08F/10/00 |
| WO | WO 01/51589 | * | 7/2001 | |
| WO | 0151589 A1 | | 7/2001 | ............ C10G/11/18 |
| WO | 0182008 A1 | | 11/2001 | ............ G05B/13/02 |

OTHER PUBLICATIONS

"NonLinear Material Balance Technique to Control Reactor Gas Composition," IBM Technical Disclosure Bulletin, IBM Corp. New York, US, vol. 40, No. 8, Aug. 1, 1997, p. 13; XP000735561; ISSN: 0018–8689.

Downs et al., "A Plant–Wide Industrial Process Control Problem," Computers chem. Engng, vol. 17, No. 3, pp. 245–255, 1993, Pergamon, Press, Great Brittain.

Ricker, "Decentralized Control of the Tennessee Eastman Challenge Process," J.Proc.Cont., vol. 6, No. 4, pp. 205–251, 1996, Elsevier, Great Brittain.

Biegler, "Advances in Nonlinerar Programming Concepts for Process Control," J.Proc.Cont., vol. 8, No. 5, pp. 301–311, 1998, Elsevier, Great Brittain.

Zheng et al., "Hierarchical Procedure for Plantwide Control System Synthesis," AIChE Journal, vol. 45, No. 6, pp. 1255–1265, 1999.

Hydrocarbon Processing, vol. 71, No. 9, pp. 114, 125–126, 138, 1992.

Hydrocarbon Processing, vol. 72, No. 9, pp. 106, 127–128, 1993.

* cited by examiner

*Primary Examiner*—Robert D. Harlan
(74) *Attorney, Agent, or Firm*—James R. Henes; David P. Yusko (57) ABSTRACT

The application discloses a system for controlling a chemical manufacturing process having at least one piece of process limiting equipment in addition to a reactor. The system employs one or more multivariable predictive optimizer controllers for optimizing control of the chemical reactor and production limiting equipment located upstream or downstream of the reactor, to provide integrated process control of the reactor and the production limiting equipment.

15 Claims, 4 Drawing Sheets

|  | $\dfrac{H_2}{C_3=}$ | $\dfrac{C_2=}{C_3=}$ | $C_3$ IN VENT |
|---|---|---|---|
| $H_2$ FLOW | $R_1$ | $R_2$ | $R_3$ |
| $C_2=$ FLOW | $R_4$ | $R_5$ | $R_6$ |
| GAS VENT FLOW | $R_7$ | $R_8$ | $R_9$ |

FIG. 3b

|  | $\dfrac{H_2}{C_3=}$ | $\dfrac{C_2=}{C_3=}$ | $C_3$ IN VENT |
|---|---|---|---|
| $H_2$ FLOW | $R_1$ | DESELECTED | DESELECTED |
| $C_2=$ FLOW | DESELECTED | $R_5$ | DESELECTED |
| GAS VENT FLOW | $R_7$ | $R_8$ | $R_9$ |

FIG. 4

INTEGRATED ADVANCED CHEMICAL PROCESS CONTROL

CROSS REFERENCE TO RELATED APPLICATIONS

This application claims the benefit of provisional patent application Ser. No. 60/325,012, filed Sep. 26, 2001, entitled "Integrated Advanced Chemical Process Control."

FIELD OF THE INVENTION

The invention relates to chemical manufacturing process control. More specifically, the invention relates to integrated control of chemical reactors and associated systems to simultaneously manage rate limiting steps located both within and external to the manufacturing process' chemical reactor system.

BACKGROUND OF THE INVENTION

Chemical reactors typically react one or more feedstocks in the presence of a catalyst system and other materials to produce a wide variety of chemical products. The reactors typically operate in the liquid or gas phase within a set of operating conditions such as temperature, pressure, and catalyst concentration to optimize the quantity or properties of the reactor product.

Some reactor systems can be controlled by monitoring indicators of important operating conditions. When an undesired trend or deviation is noted, an operator can intervene, altering one or more controllable parameters to attempt to return the reactor system to its desired operating conditions. Unfortunately, such rudimentary control systems typically are not practical for use with complex, continuous process reactors of the type employed in most modern chemical plants. Even where such a rudimentary control process can be used, the reactor operator's response is subjective, and can be too great, too small or, in the worst case, incorrect.

For this reason, modern chemical reactors typically employ a computer-based control system that continuously monitors and adjusts reactor parameters with great speed and accuracy. These modern control systems can operate in a manner analogous to the cruise control system of an automobile, allowing the control system to maintain an optimal reactor operating state without operator intervention, and permitting an operator to indicate a desired change in the operating state to the control system without having to dictate the system changes required to reach that desired end-state.

One example of a modern chemical reactor control system is the distributed control system, or "DCS", used to control chemical reactors such as those used for the gas-phase manufacture of a polyolefin such as polypropylene. The DCS monitors critical reactor parameters on a continuous basis, and employs a number of local regulatory control loops to alter operating conditions such as catalyst flow, propylene monomer flow, and hydrogen flow. The use of DCS in polypropylene production has resulted in the ability to reliably produce large quantities of high quality polypropylenes. Nevertheless, the inherent limitations of local regulatory control loops and their associated control logic leave room for improvement in reactor control.

To further improve the performance of modern polyolefin reactors, plant engineers have turned to advanced process control systems, or "APC's", to optimize control of the reactor system. These APC's employ state of the art modeling techniques such as neural networks, partial least squares, principle component regression or first principles models to infer impending changes of reactor state variables, and can then provide anticipatory control signals to the DCS local control loops to maintain the reactor in the optimum state. Because the APC's can anticipate changes in reactor state variables, the reactor can be maintained nearer to its optimal operating conditions than if control is based solely on deviations noted in DCS trends and the resulting local loop control changes.

Despite the availability of such state of the art advanced control techniques, modern chemical plants fail to deliver product at the theoretical maximums of quality and quantity. What is needed is a means to improve the performance of chemical plants above and beyond that enabled by advanced reactor process control systems.

SUMMARY OF THE INVENTION

Surprisingly, we find that even where state of the art reactor control processes are employed, substantial improvement in chemical plant performance may be provided by integrating control of certain rate limiting pieces of upstream or downstream equipment into a plant's advanced process control system.

Specifically, in one embodiment of our invention, we disclose a system for controlling a chemical manufacturing process that has at least one chemical reactor and production limiting equipment located upstream or downstream from the reactor. A first multivariable predictive optimizer controller optimizes control of the chemical reactor, while a second multivariable predictive optimizer controller operates hierarchically above the first controller and the production limiting equipment to provide integrated process control of the reactor and the production limiting equipment. An example of this embodiment is where the second controller simultaneously optimizes operation of an extruder located downstream from a polyolefin manufacturing reactor. Preferably, a third multivariable predictive optimizer controller operates hierarchically below the second controller to improve control of the production limiting equipment, such as an extruder.

As used in this application, the term "chemical reactor" means any vessel in which a chemical feedstock is converted into a different chemical effluent, whether or not in the presence of a catalyst or other materials, and without regard for whether the reaction occurs in a liquid, solid or gaseous phase, or combinations thereof.

As used in this application, the term "multivariable predictive optimizer controller" means a controller that is based on linear or non-linear, multi-variable, dynamic (i.e., time-variant) expressions, which is the compiling or calculation of a matrix of values or functions which relate a plurality of manipulated and, optionally, disturbance variables, to a plurality of control variables, and optionally, constraint variables in such a manner as to facilitate prediction of state variables at future points in time and to enable control of a system based in whole or in part on such predictions.

As used in this application, the term "production limiting factor" means any equipment or condition located upstream or downstream of the reactor system controlled by a reactor's multivariable predictive optimizer controller or controllers that limits the chemical manufacturing process' ability to deliver the quality or quantity of the manufactured product. "Production limiting equipment" means any physical plant equipment such as an extruder or heat exchanger located upstream or downstream of the reactor system controlled by a reactor's multivariable predictive optimizer controller or controllers that limits the chemical manufacturing process' ability to deliver the quality or quantity of the manufactured product.

In another embodiment of our invention, a chemical manufacturing process includes at least one chemical reactor, production limiting equipment located upstream or downstream from the reactor, a first non-linear multivariable predictive optimizer controller for optimizing control of the chemical reactor, and a second non-linear multivariable predictive optimizing controller operating hierarchically above the first controller and the production limiting equipment to provide integrated process control of the reactor and the production limiting equipment.

Preferably, the process also includes a third multivariable predictive optimizer controller operating hierarchically below the second controller to optimize control of the production limiting equipment.

In preferred embodiments of these inventions, the chemical reactor is a polyolefin reactor. As used herein, a "polyolefin reactor" is a chemical reactor in which at least fifty weight percent of the reactor feedstock is propylene, ethylene or a mixture thereof and in which the propylene and/or ethylene is reacted in the presence of a catalyst to produce a polyolefin comprising polypropylene, polyethylene or a polypropylene/polyethylene copolymer. Polyolefins of this type may also include one or more alpha-olefins having four or more carbon atoms. Preferably, polyolefin reactors use catalysts selected from the group consisting of Ziegler-Natta, late transition metal, and metallocene catalysts.

Yet another embodiment of the invention is a system for controlling a chemical manufacturing process occurring at least partially in the gas phase. The system has at least one chemical reactor and production limiting equipment located downstream from the reactor, and includes a first multivariable predictive optimizer controller for optimizing control of the chemical reactor, and a second multivariable predictive optimizer controller for controlling gas composition related to operation of the reactor. The system also includes a third multivariable predictive optimizing controller operating hierarchically above the first controller, the second controller and the production limiting equipment for providing integrated process control of the reactor and the production limiting equipment. This embodiment is particularly useful for the manufacture of polyolefins, and in particular, propylene-containing polymers, and can be used effectively in connection with one or more horizontally agitated, subfluidized bed gas phase reactors.

In some embodiments, the use of non-linear multivariable predictive optimizing controllers is preferred.

As used in this application, the term "non-linear", when used in describing a controller, means a controller that is capable of optimizing non-linear relationships, either directly or, more typically, indirectly, by approximating solutions to non-linear relationships, such as by using multiple equations to model a non-linear relationship over discrete ranges of variable values.

The systems and processes of our invention are particularly useful when the reactor and the production limiting equipment are "close coupled," as close coupling between the reactor and the production limiting equipment causes control of the reactor or production limiting equipment to more directly affect operation of the other closely coupled component (i.e., the production limiting equipment or the reactor). As used herein, a system is "close coupled" if the surge capacity of the system between the reactor and the production limiting equipment is less than three times the nominal production rate of the system. For example, if the production limiting equipment is located downstream from the reactor and the system operates at a nominal, steady-state production rate of 100 units per hour, a close coupled system will have less than 300 units of surge capacity between the reactor discharge and the inlet to the production limiting equipment. In this context, "surge capacity" means the difference between the permitted low and high material inventory between the reactor discharge and the inlet to the production limiting equipment during steady-state operation of the chemical manufacturing system. Similarly, if the production limiting equipment is located upstream of the chemical reactor and the system operates at a nominal, steady-state production rate of 100 units per hour, a close coupled system will have less than 300 units of surge capacity between the discharge of the production limiting equipment and the inlet to the reactor.

In still another embodiment of the invention, the invention is implemented by a single multivariable predictive optimizing controller for optimizing control of the chemical reactor and production limiting equipment. The controller simultaneously considers the relationships between all variables in a single M by N matrix in which the M rows of the matrix are defined by the manipulated and disturbance variables, and the N columns of the matrix are defined by the control and constraint variables. Although this embodiment is computationally more complex, the invention may be implemented in this manner where sufficient computational power is available for solving the more complex system. This embodiment may prove advantageous in some applications because it permits the model to be built looking at the relationship between all control and constraint variables and the manipulated and disturbance variables, possibly revealing relationships that are not considered when the initial model is built using smaller, separate controllers focused on particular aspects of the manufacturing system. As in other embodiments, this embodiment preferably employs a non-linear controller, and can be advantageously used in connection with polyolefin reactors where an extruder is a downstream piece of production limiting equipment.

DETAILED DESCRIPTION OF THE INVENTION

Applicants' invention is described below in connection with the manufacture of extruded impact copolymers of polypropylene and polyethylene. Applicants' invention is useful in virtually any chemical manufacturing environment, and can be easily adapted to other applications by application of the teachings contained in this application.

Figure 1:
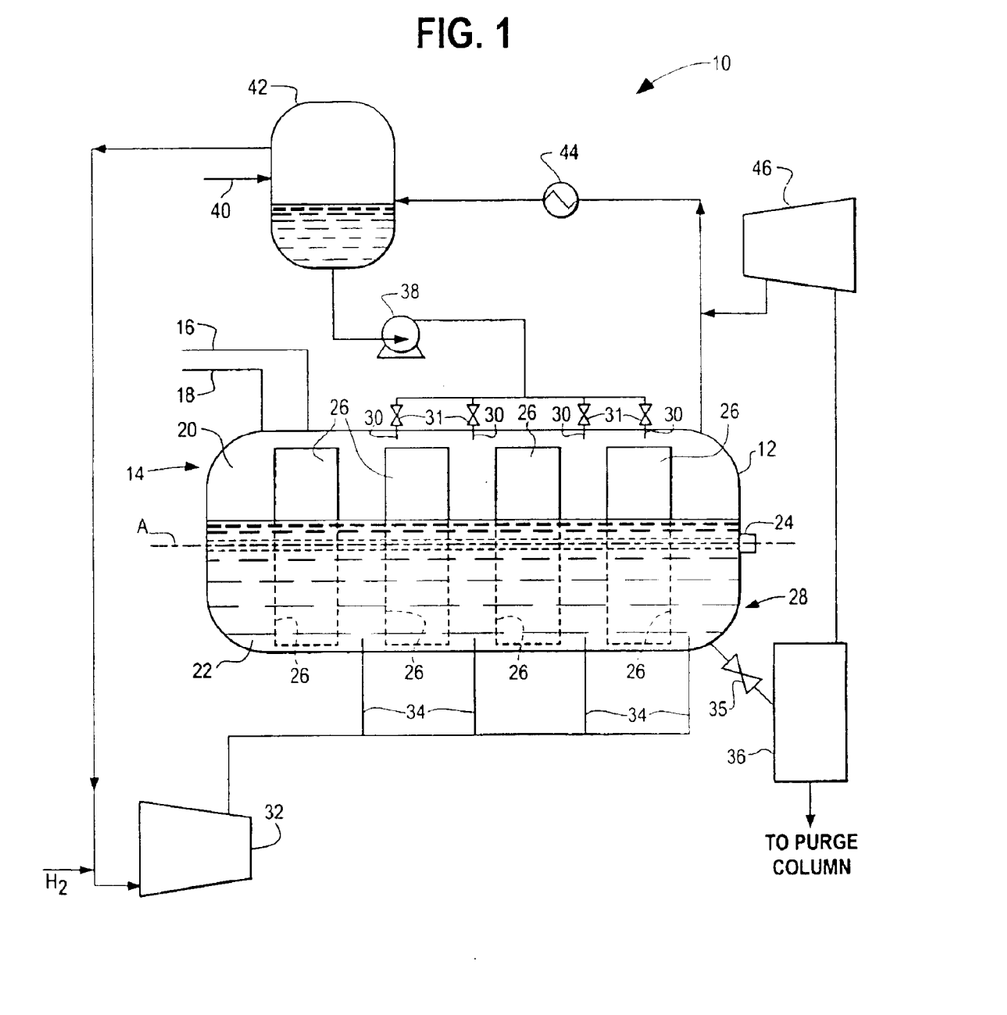
FIG. 1 is a diagram showing a horizontally agitated subfluidized bed reactor and associated equipment for the manufacture of polypropylene.

FIG. 1 illustrates a horizontal, mechanically-agitated, subfluidized bed reactor system 10 including certain key associated equipment used for the manufacture of polypropylene.

Polymerization of monomer feedstock occurs in a horizontal, cylindrical reactor vessel 12. Catalyst, co-catalyst and modifiers can be fed at a continuously variable rate separately into an inlet end 14 of vessel 12 through feedlines 16 and 18.

During steady state operation, polymerization begins in a vapor space 20 located in the upper portion of vessel 12, and, as particle size increases and particles settle, continues in a particulate bed 22 occupying the lower portion of vessel 12. An agitator 24 is located along the longitudinal axis A of vessel 12. Paddles 26 of agitator 24 stir particulate bed 22 as agitator 24 is turned, thereby promoting mixing and a plug flow movement of material in particulate bed 22 towards a discharge end 28 of vessel 12.

Monomer and condensed liquid from vapor/liquid separator 42 (collectively referred to as "quench liquid") are added into vapor space 20 of vessel 12 through quench nozzles 30 longitudinally located in vapor space 20 near the top of vessel 12. The liquid added through nozzles 30 cools hot particles located on the upper surface of particulate bed 22, and paddles 26 subsequently drive these cooled particles and any remaining liquid monomer into particulate bed 22 to continue the exothermic polymerization reaction and to further cool bed 22. The flow of liquid into vessel 12 can be controlled regionally within vessel 12 by quench control valves 31.

Recycled reactor vapor can be introduced through compressor 32 into a lower portion of bed 22 through gas inlets 34. Hydrogen also can be introduced into the lower portion of bed 22 through gas inlets 34 by adding hydrogen at or near the inlet or outlet of compressor 32.

Polymer product is removed from discharge end 28 of vessel 12 through one or more discharge valves 35. The discharged product passes through a solid/gas separator 36 (also referred to as the "baghouse"), after which the discharged solid product is transferred to a purge column (see FIG. 2), while the separated gas is routed to offgas compressor 46 to be compressed prior to condensation for make-up to vessel 12.

Reactor offgas cooler condenser 44 condenses vapor drawn directly from reactor vapor space 20, as well as condensed offgas removed from solid/liquid separator 36, which was compressed by offgas compressor 46. Vapor and liquid feed to vessel 12 is accomplished using liquid/vapor separator 42. Liquid for feed to vessel 12 through pump 38 is a combination of condensate and fresh monomer make-up through monomer make-up line 40.

Under nominal operating conditions, the reactor system described above operates at pressures of from about 1400 to 2800 kPa (200 to 400 psig) and at temperatures of from about 50 to 90 degrees Centigrade (122 to 194 degrees Fahrenheit). The volume of the particulate polymer bed typically occupies between about 40 and 80 percent of the volume of vessel 12.

Reactor system 10 typically can be used to produce homopolypropylene or random copolymers of propylene and other alpha-olefins such as ethylene. Control of such a reactor system involves manipulating the equipment discussed above to alter reactor conditions both to maximize production and to optimize product quality.

Control of a reactor system like the one described above typically requires manipulation of:

a) catalyst flow to control production rate;

b) hydrogen concentration to control molecular weight or melt flow rate;

c) comonomer feed and concentration (when making random copolymers) to control product properties;

d) cocatalyst to catalyst ratio;

e) cocatalyst to electron donor ratio when using catalyst systems having co-catalysts such as tri-aluminum alkyls and external electron donors; and f) various gas concentrations and ratios in the recycle loops to determine the proper make-up of raw and recycled materials to maintain the desired in-reactor concentrations.

Figure 2:
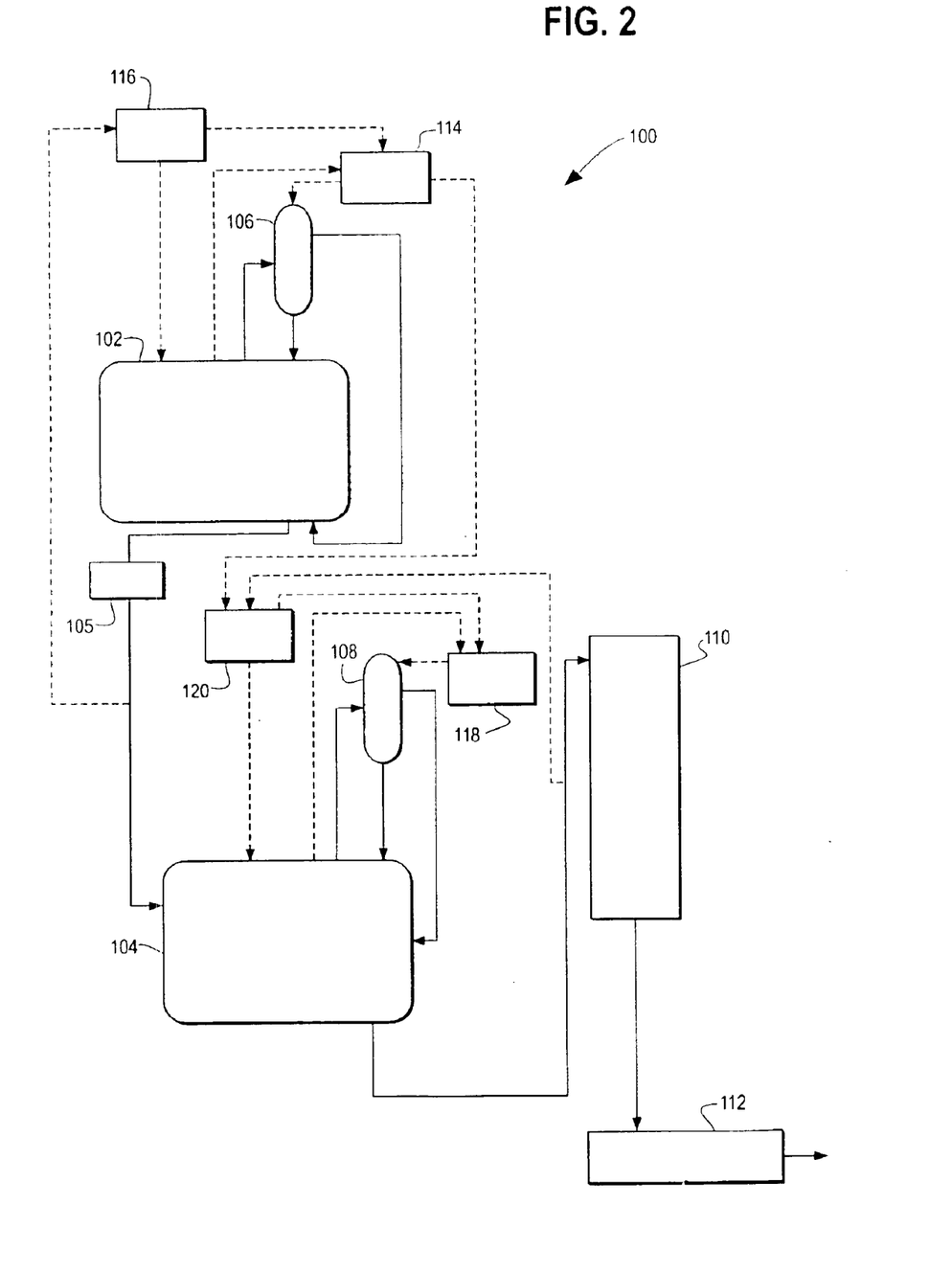
FIG. 2 is a schematic diagram of a system for making impact copolymers of polypropylene. The system uses two reactors of the type described in connection with FIG. 1 and employs advanced process control techniques to optimize copolymer production.

FIG. 2 is a simplified schematic diagram of a multiple reactor system 100 capable of making homopolymers, random copolymers and impact copolymers of polypropylene. The diagram includes major process components and illustrates the architecture of advanced process controllers used in the system. Specifically, the system uses two reactors of the type described in connection with FIG. 1 and employs advanced process control techniques to optimize copolymer production. System 100 employs four non-linear multivariable predictive optimizer controllers to maximize production and quality of the desired products, and to minimize the transition time between products.

System 100 physical plant equipment includes a first reactor 102, a second reactor 104, a powder transfer system 105, or "blowcase", for transferring polypropylene powder from first reactor 102 to second reactor 104, a first reactor gas/liquid separator 106, a second reactor gas/liquid separator 108, a purge column 110 for degassing residual hydrocarbons from the impact copolymer powder produced in reactor 104, and an extruder 112 for converting the degassed powder into pellets as are typically used by the conversion industry.

Reactors 102 and 104 each operate in the manner described in detail in connection with the description of system 10 of FIG. 1. The principal physical plant difference between system 10 and system 100 is that system 100's reactors 102 and 104 operate in series to produce homopolymers, random copolymers and impact copolymer product. The series operation of horizontal gas phase reactors of this type is well known to those skilled in the art, and is described in our U.S. Pat. Nos. 4,888,704 and 5,504,166, the disclosures of each being incorporated by reference into this application.

As noted above, system 100 also employs four non-linear multivariable predictive optimizer controllers.

Controller 114 is a first gas composition controller for reactor 102, and is associated primarily with control of the gases added to and recycled through reactor 102.

Controller 116 is a first reactor controller, and is associated primarily with the production of polymer in first reactor 102.

Controller 118 is a second gas composition controller, which is associated primarily with control of the gases added to and recycled through reactor 104.

Controller 120 is a second reactor controller, and is associated primarily with the production of polymer in second reactor 104. In FIG. 2, solid arrows between physical plant hardware elements 102, 104, 106, 108, 110 and 112 generally indicate the flow of material through the system, while dashed arrows to and from controllers 114, 116, 118 and 120 generally indicate the flow of information and control information to and from those controllers.

The operation of controllers 114, 116, 118 and 120 is most easily described in connection with Tables 1, 2, 3 and 4 below, respectively. Tables 1 through 4 list the primary system variables that are manipulated by each optimizer, as well as the operating parameters that are most directly affected by manipulation of corresponding system variables. It should be noted that the variables specified in this and following examples are those for impact copolymer production. There would not need to be ethylene-related variables would not be needed if the two reactor system was employed to make homopolymer.

TABLE 1

First Gas Composition Controller

| Manipulated Variables | Control Variables |
| --- | --- |
| Hydrogen (H2) Flow | Offgas Hydrogen to Propylene Ratio (H2/C3=) |
| Ethylene (C2=) Flow | |
| Gas Vent Flow (from liquid/gas separator) | Offgas Ethylene to Propylene Ratio (C2=/C3=) |
| | Propane Concentration in Offgas Vent (C3 in vent) |

| Disturbance Variables | Constraint Variables |
| --- | --- |
| Gas Vent Rate | None |
| Make-up Rate (fresh monomer flow into the first reactor liquid/gas separator) | |
| Production Rate | |

First gas composition controller 114 is based on a time dependent, non-linear model that is developed by accumulating data for a representative operating period. The model is subsequently adjusted by a process control engineer familiar with the chemical process to be controlled as discussed below.

First, the relationship between the dependent and independent process variables is developed through the modeling software. The period of time required to collect sufficient data to develop a robust process model will vary, but for an impact copolymer plant such as system 100, operating periods of six months or so will provide excellent correlations between variables over a wide range of operating conditions and product slates.

Figure 3A:
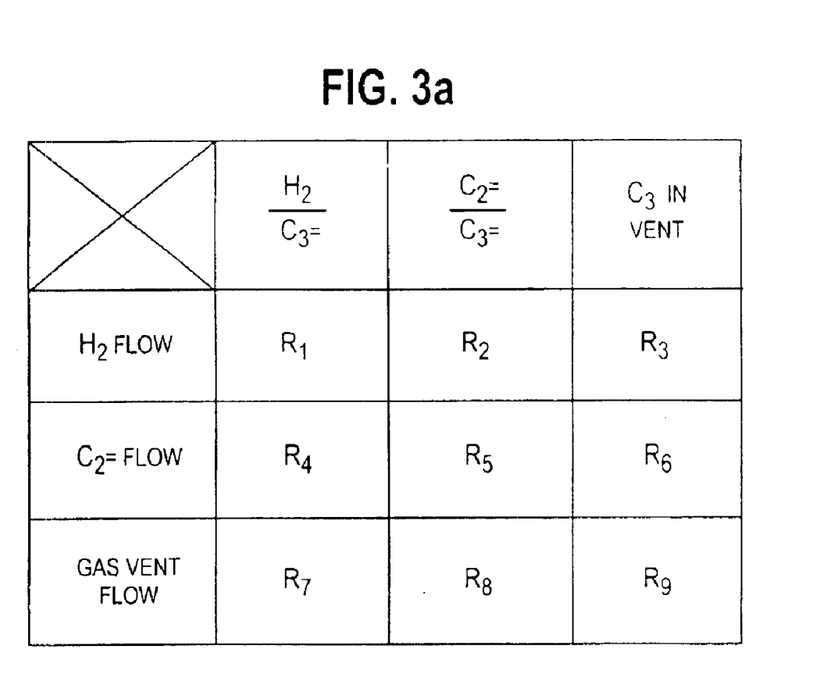
FIGS. 3a and 3b illustrate the relationships modeled by and selected for use in a non-linear multivariable predictive optimizer controller used in connection with the first gas composition controller of the system of FIG. 2
Figure 3B:
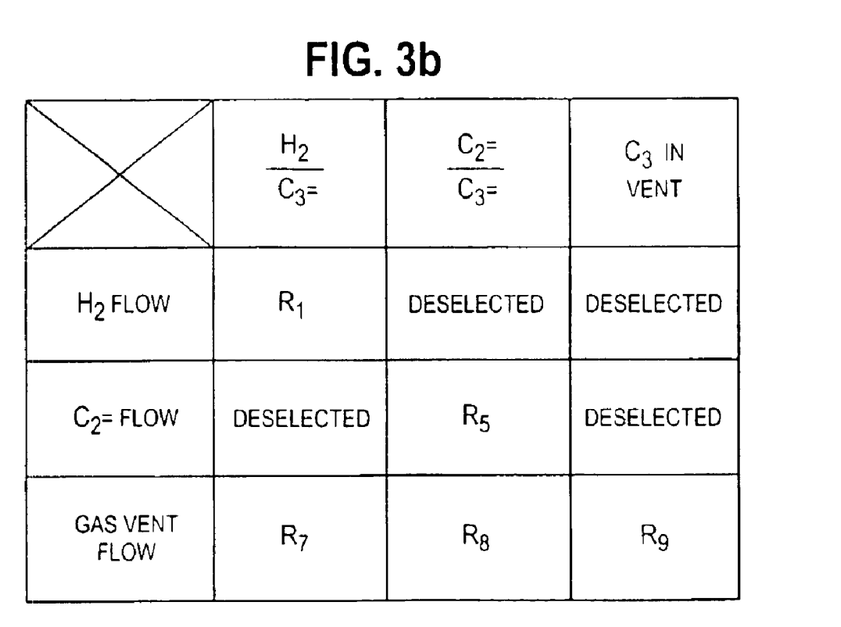

The model developed for first gas composition controller 114, and its subsequent modification for use by a process engineer, is schematized in FIG. 3.

FIG. 3a is a three by three matrix describing relationships R1 through R9 which are the correlations between hydrogen flow, ethylene flow, gas vent flow, offgas hydrogen to propylene ratio, offgas ethylene to propylene ratio and propane concentration in offgas vent as modeled for first gas composition controller 114. These relationships are non-stationary, often non-linear relationships which, although accurately describing the modeled performance of the first reactor offgas system, may or may not be suitable for reactor control.

Once these relationships have been developed, the process control engineer carefully examines each relationship to examine its effect on the process control model. Where the response of the model is deemed by the process engineer to be unstable, extremely non-linear, or otherwise not well suited for stable process control, the engineer deselects the modeled relationship from the model, leaving a matrix having a lesser number of relationships which are routinely used in the model for process control.

FIG. 3b represents a final configuration for the model used in first offgas controller 114. As can be seen from FIG. 3b, the relationships R2 (relationship between hydrogen flow and ethylene to propylene ratio), R3 (relationship between hydrogen flow and propane in the offgas vent), R4 (relationship between ethylene flow and hydrogen to propylene ratio) and R6 (relationship between ethylene flow and propane in the offgas vent) have been deselected from the model, either because of unwanted actions they are expected to cause in control response or because they are otherwise deemed inappropriate by the process control engineer.

During the process engineer's review of the model, he may also specify certain constraints within the model for any particular variable, or a variable as a disturbance variable (a variable known to impact a control variable but is limited or prevented from manipulating that variable in the model). Techniques for the deselection of certain process relationships and the specification of process constraints are well-known to those skilled in the process control arts, and can be found, for example in "Process Control: Structures and Applications", Balchen, J. G. and Mumme, K. I., 1988, and "Application of Neural Networks to Modeling and Control", Gomm, J. B., Page, G. F. and Williams, D., 1993, the disclosures of which are hereby incorporated by reference. Programs for developing models of this type are available commercially from a number of sources, such as the PROCESS INSIGHTS and PROCESS PERFECTER programs available from Pavilion Technologies, Inc. of Austin, Tex., or the ASPEN IQ and DMC PLUS programs available from Aspen Technologies, Inc. of Cambridge, Mass. Note that in the engineer's analysis of the relationships in a given controller such as the first gas controller discussed above, disturbance variables would be listed and conceptually considered with the manipulated variables, while constraints would be considered conceptually with the control variables (i.e., the disturbance variables would be listed in the left hand column and the constraint variables would be listed in the top row of FIG. 3a). These constraint and disturbance variables have been omitted to simplify the foregoing explanation.

Tables 2, 3 and 4 specify the relationships used in first reactor controller 116, second offgas controller 118, and second reactor controller 120. The initial models for these controllers are developed in the same manner as that of first offgas controller 114, and are subsequently modified by the process control engineer as discussed above.

TABLE 2

First Reactor Controller

| Manipulated Variables | Control Variables |
| --- | --- |
| Catalyst Flow | Production Rate |
| Hydrogen Concentration in Reactor | Melt Flow Rate |
| Ethylene Concentration in Reactor | Percent Ethylene in Product |
| Electron Donor to Catalyst Ratio | Product Parameters (such as hexane extractables and decalin soluables) |
| Reactor Vapor to Liquid Ratio | |
| Aluminum to Silica Ratio | |

| Disturbance Variables | Constraint Variables |
| --- | --- |
| Electron Donor to Catalyst Ratio | Cooling Water Valve Position (to offgas condenser) |
| Reactor Temperature | |
| Catalyst Yield | Propylene Quench Liquid Valve Position |

The primary objectives of the first reactor controller are to maximize production rate, stabilize quality, and minimize transition time. Primary controller constraints that the controller must respect are the capabilities of the reactor cooling system and the reactor quench system.

In connection with the first and second reactor controllers, it should be noted that data for many parameters is not directly available or will need to be modeled based on other measurable parameters for use in the model. Values for melt flow rates, percent ethylene, hexane extractables and decalin soluables are variables of this type. These parameters can be modeled as required by those skilled in the chemical and control arts. Guidance on modeling parameters of this type can also be found in the references noted above, as well as in U.S. Pat. Nos. 5,933,345 and 5,877,954, the disclosures of which are hereby incorporated by reference. Commercially available software suitable for modeling these parameters includes the ASPEN IQ and DMC PLUS software available from Aspen Technologies, Inc. and the PROCESS INSIGHTS and PROCESS PERFECTER software available form Pavilion Technologies, Inc. Additional information about the application of controllers of the type discussed above can be found in U.S. Pat. No. 4,616,308 to Morshedi, and in U.S. Pat. No. 4,349,869 to Prett, the disclosures of which are incorporated by reference in their entirety.

TABLE 3

Second Gas Composition Controller

| Manipulated Variables | Control Variables |
| --- | --- |
| Hydrogen (H2) Flow | Offgas Hydrogen to Propylene Ratio |
| Ethylene (C2=) Flow | Offgas Ethylene to Propylene Ratio |
| Gas Vent Flow (from liquid/gas separator) | Propane Concentration in Offgas Vent |
| | Propane Concentration in Recycle Liquid |

| Disturbance Variables | Constraint Variables |
| --- | --- |
| Make-Up Rate (fresh monomer flow into the second liquid/gas separator) | None |

It should be noted that the second reactor gas composition controller is essentially identical to the first reactor gas composition controller.

TABLE 4

Second Reactor Controller

| Manipulated Variables | Control Variables |
| --- | --- |
| Offgas Hydrogen to Propylene Ratio | Melt Flow Rate |
| Offgas Ethylene to Propylene Ratio | Polymer Rubber Fraction (% RC) |
| Activity Control Agent Flow | |
| Reactor Vapor to Liquid Ratio | Ethylene Content in Rubber (% RCC2) |

| Disturbance Variables | Constraint Variables |
| --- | --- |
| Make-Up Rate (fresh monomer flow into the second reactor liquid/gas separator) | None |

Unfortunately, we believe that even state of the art control schemes such as those disclosed above do not lead to optimal performance of a polypropylene plant. The reason for this is that even these sophisticated reactor control systems fail to incorporate relevant data from upstream or downstream process equipment that, if incorporated, would cause the advanced process controllers to reach a different result.

In the foregoing example, we believe that the polypropylene plant productivity can be substantially enhanced by adding an additional non-linear multivariable predictive optimizer controller to control the extruder, and an additional non-linear multivariable predictive optimized control operating hierarchically "above" the reactor and gas composition controllers and the extruder controller to maximize the overall production rate of the system. While not wishing to be bound by any particular theory, we believe that local control of extruder 112 may lead to unnecessary conservative extruder operation. This is believed to be particularly relevant where, for example, the heavy workload of an extruder operator may cause him to make conservative decisions to avoid any chance that aggressive, unattended extruder operation may lead to an extruder shutdown or upstream upset, that may in turn lead to shutdown or impaired operation of reactors 102 and 104.

Figure 4:
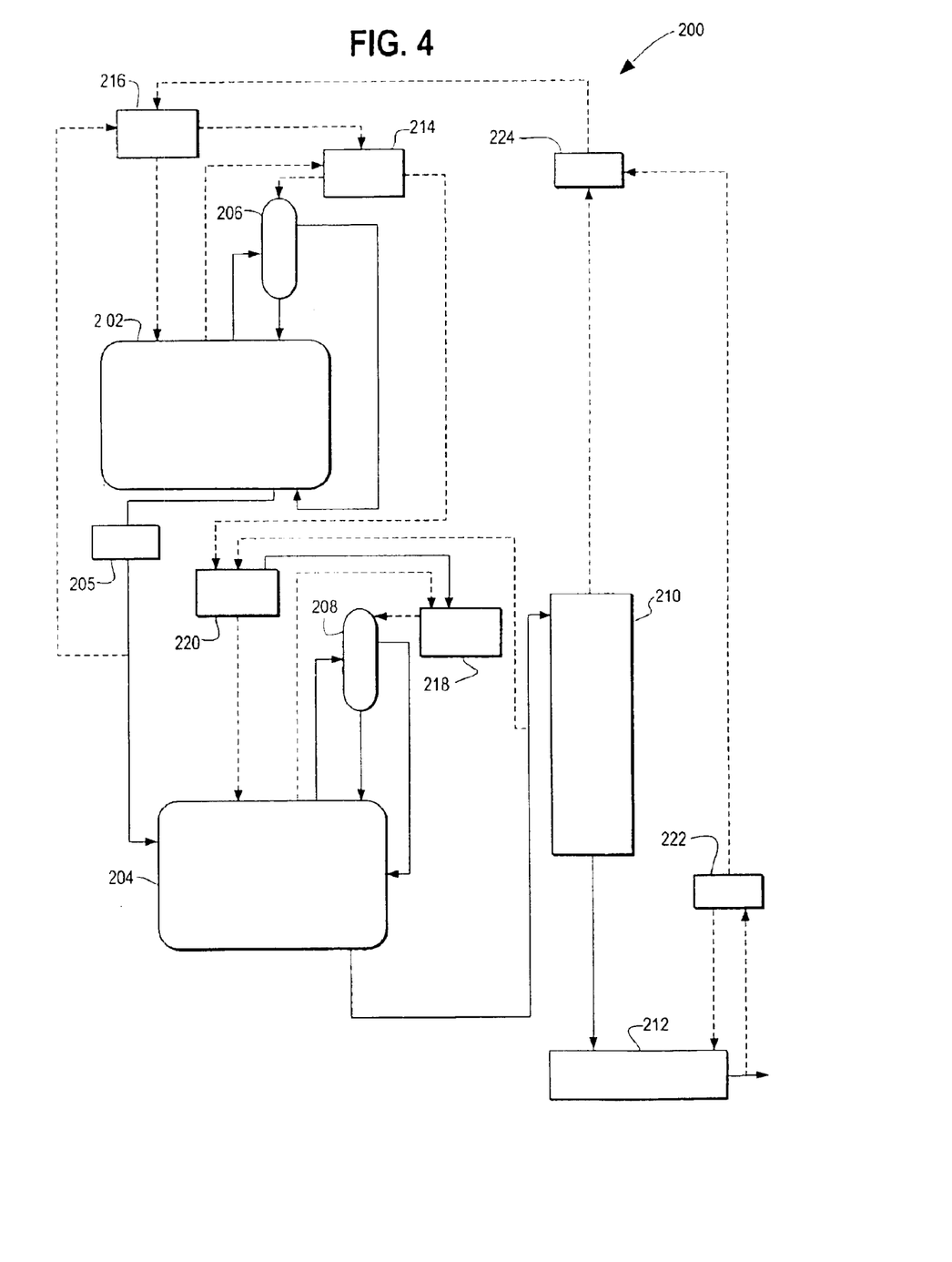
FIG. 4 is a schematic diagram of the system of FIG. 2 modified in accordance with the present invention to improve copolymer production.

FIG. 4 illustrates a system 200 in which an extruder controller and an overriding production controller have been added to enhance physical plant productivity. Equipment includes a first reactor 202, a second reactor 204, a powder transfer system 205, or "blowcase", for transferring polypropylene powder from first reactor 202 to second reactor 204, a first reactor solid/liquid separator 206, a second reactor solid/liquid separator 208, a purge column 210 for degassing residual hydrocarbons from the impact copolymer powder produced in reactor 204 and which at any given time contains a nominal inventory of powder between a preset upper and lower limit, and an extruder 212 for converting the degassed powder into solid polymer strands that are cut into pellets as are typically used by the conversion industry.

As with system 100, reactors 202 and 204 each operate in the manner described in detail in connection with the description of FIGS. 1 and 2. Also, as in FIG. 2, solid arrows between physical plant hardware elements generally indicate the flow of material through the system, while dashed arrows to and from controllers generally indicate the flow of information and control information to and from those controllers.

System 200 employs six non-linear multivariable predictive optimizer controllers.

As with system 100, controller 214 is a first gas composition controller for reactor 202, and is associated primarily with control of the gases added to and recycled through reactor 202. Controller 216 is a first reactor controller, and is associated primarily with the production of polymer in first reactor 202. Controller 218 is a second gas composition controller, which is associated primarily with control of the gases added to and recycled through reactor 204. Controller 220 is a second reactor controller, and is associated primarily with the production of polymer in second reactor 204.

Unlike system 100, system 200 includes a fifth controller, the extruder controller 222, which is associated directly with operation of extruder 212, and a sixth controller, the production rate controller 224, which is associated with high level production optimization.

The operation of controllers 214, 216, 218 and 220 is analogous to the operation of controllers 114, 116, 118 and 120 in system 100.

Table 5 identifies the parameters associated with extruder controller 222.

TABLE 5

Extruder Controller

| Manipulated Variables | Control Variables |
| --- | --- |
| Powder Feeder | Extruder Production Rate |
| Peroxide Feed | Extruder Melt Flow Rate |

TABLE 5-continued

Extruder Controller

| Disturbance Variables | Constraint Variables |
|---|---|
| Reactor Melt Flow Rate (of polymer into extruder) Reactor Production Rate | Pelletizer Speed Extruder Motor Current Mixer Motor Current Gear Pump Speed Gear Pump Current Extruder Screen Pack Differential Pressure Extruder Spin Drier Current |

As with the other controllers, relevant constraints should be identified; in this case, they are listed above. It should be noted that peroxide feed to the extruder is used to control the rheology of the extruded material, as is well known in the art and is discussed in detail in U.S. Pat. No. 4,448,736, the disclosure of which is hereby incorporated by reference. It should also be noted that the extruder variables listed above are representative of multiple types of extruder configurations, and some of these variables will not be relevant to a particular extruder configuration.

Table 6 identifies the parameters associated with production rate controller 224.

TABLE 6

Production Rate Controller

| Manipulated Variables | Control Variables |
|---|---|
| First Reactor Production Rate Extruder Production Rate | Total Production (as measured at extruder output) First Reactor Production Rate Extruder Production Rate |
| Disturbance Variables | Constraint Variables |
| None | First Reactor Incremental Production Rate of Change Extruder Incremental Production Second Reactor Cooling Water Valve Position Second Reactor Quench Valve Position Blowcase Level Purge Column Level Silo Inventory (if silo used) Baghouse Pressure |

Again, relevant constraints should be identified; in this case, they are listed above.

In another embodiment of the invention, the relationship between all manipulated, disturbance, control and constraint variables is specified in a single M by N matrix, where M is the total number of manipulated variables and disturbance variables, and N is the total number of control and constraint variables. Although simultaneously considering the relationships between all variables in a single M by N matrix is computationally more complex, the invention may be implemented in this manner where sufficient computational power is available for solving the more complex system.

The matrix of relationships just described can be visualized with the help of Tables 1–6. When the variables in these Tables are considered together, it can be seen that there are M rows of the matrix defined by the manipulated and disturbance variables, and N columns of the matrix defined by the control and constraint variables. Once the optimizer has developed the requisite relationships between the M rows and the N columns, as in connection with FIG. 3a, the control engineer deselects those relationships not desired in the same manner as in connection with the discussion of FIGS. 3a and 3b to produce a depopulated set of relationships as in FIG. 3b except on an obviously grander scale.

A potential advantage of this embodiment of the invention is that relationships between variables unrelated in the previous example are identified during model building. The process control engineer can judge whether any of these additional relationships may improve the model, and can select them if desired. In many cases, the simpler embodiment described earlier will be sufficient to provide the advantages of the invention, but if the computational resources exist to build up a model containing the relationship between all variables, it is possible that the more complex model will yield a better control result in certain cases.

System 200, including integrated control of downstream production limiting equipment such as extruder 112, is particularly advantageous when the reactor and the extruder are "close coupled."

As can be appreciated by those skilled in the control art, closely coupled systems are more sensitive to downstream perturbations and are more likely to benefit from the application of integrated advanced process control systems as described in our application.

We believe that the application of extruder controller 222 and production rate controller 224 in a configuration similar to system 200 can result in an average increase in production rate of from about one to at least about five percent when compared to a similar system of modern design such as system 100, which does not apply integrated advanced process control to a piece of downstream production limiting equipment such as extruder 112. Additionally, we believe that transition times from one grade of propylene polymer to another can be substantially reduced from about 10 to about 60 percent from the transition times associated with manufacturing systems, which do not employ integrated advanced process control of the reactor system and rate limiting equipment external to the reactor system.

The implementation of advanced process control techniques such as those discussed above can be applied to virtually any chemical manufacturing process, particularly if advanced process control has been applied to the system's reactor or reactors, and if there is at least one piece of upstream or downstream production limiting equipment. The production limiting equipment should be controllable in concert with the reactor system such that the overall production and/or product quality of the chemical manufacturing process is improved by the use of at least one, preferably non-linear, multivariable predictive optimizer controller capable of integrating control of the process' reactor and the rate-limiting equipment.

Other types of rate-limiting equipment which can be advantageously controlled in accordance with the invention include high capital cost items such as large rotary and agitated dryers, continuous centrifuges and units such as packaging lines, whether located upstream or downstream of the chemical reactor system.

Preferably, the configuration's production limiting equipment itself is susceptible to implementation of its own non-linear multivariable predictive optimizer controller operating hierarchically below the production controller, or, if the single matrix embodiment discussed above is used, is susceptible to non-linear multivariable predictive control. Note that while multivariable predictive optimization of the reactor system is preferred, it is not required by our invention. Rather, the inventor requires only that the multivariable predictive optimizer take input from both the reactor system and the production-limiting equipment to maximize their cooperative performance.

While many other polymer manufacturing processes exist that can employ optimized non-linear multivariable predictive control of a chemical reactor and can benefit from the application of a non-linear multivariable predictive optimizer controller of the types described above, other potential applications abound.

For example, other polyolefin manufacturing processes which might employ our invention, in connection with an extruder or other piece of rate limiting equipment upstream or downstream of the reactor system, include "slurry", "bulk", and fluidized bed polymerization processes employing any of a number of different catalysts such as Ziegler-Natta, metallocene or late transition metal catalysts.

In a slurry reactor process, polymerization occurs in a hydrocarbon liquid having a different chemical composition than that of the monomer polymerized. The choice of solvent can vary, with solvents such as hexane and ISOPAR being useful in polypropylene polymerization, and with one or more "drying" step employing equipment such as flash distillation units and centrifuges for solid, liquid and unreacted monomer separation. The selection of manipulated, disturbance, control and constraint control variables in such systems generally will follow the methodology identified in the previous examples, with certain alterations dictated by the nature of the process, as will be apparent to chemical engineers of ordinary skill in the process control art. For example, where the system consists of a plurality of parallel reactors, vapor/liquid equilibrium could be used to estimate compositions present in the liquid phase, and those calculations can be used as control variables in the gas controller (see, for example, U.S. Pat. No. 4,888,704 to Topliss). In the reactor controller, constraint control variables would stay substantially the same, but because propylene quench is not used for cooling, this manipulated variable would be replaced with cooling water flow splits to various pieces of heat exchange equipment. Solids concentration in the reactor would be added as a control variable, with additional constraint control variables added that derive from the capacity of the drying equipment already mentioned. Particularly useful constraint control variables for this equipment are believed to be flasher pressure for the flash separator, and motor current for the centrifuge(s). Extruder and production controllers could operate with substantially the same variables as already described above in detail in connection with the two reactor polypropylene reactor manufacturing system.

If the slurry system were to employ a plurality of series connected reactors, the gas controller could employ as control and manipulated variables parameters related to regional hydrogen concentration, or multiple gas controllers could be employed to model upstream and downstream portions of the reactor system.

"Bulk" polymerization processes, in which polymer is formed from a solution of monomer, could employ the same types of variables discussed above.

Finally, a fluidized bed olefin polymerization system would work much in the same way as described above in detail for the two reactor polypropylene system, except that it would be necessary to establish additional control, manipulated and constraint control variables associated with the operation such as fluidizing gas flow, bed height and the like. In some cases, it may be desirable to implement temperature and pressure control variables in any of the foregoing systems.

Thus, one skilled in the chemical manufacturing arts can see that even where state of the art non-linear multivariable predictive optimizer control has been applied to chemical reactor systems, additional non-linear multivariable predictive optimizer control, operating hierarchically above the reactor system and other production-limiting equipment, can enhance the operation of the manufacturing process. Our invention therefore is intended to be limited only by the scope of the following claims.

We claim:

1. A system for controlling a chemical manufacturing process having at least one chemical reactor and production-limiting factor located upstream or downstream from the reactor, comprising: a first multivariable predictive optimizer controller for optimizing control of the chemical reactor; and a second multivariable predictive optimizer controller operating hierarchically above the first controller and the production-limiting factor for providing integrated process control of the reactor and the production-limiting factor.

2. The system of claim 1 further including a third multivariable predictive optimizer controller operating hierarchically below the second controller for controlling the production-limiting factor.

3. The system of claim 1 wherein the production-limiting factor is production limiting equipment located downstream from the reactor.

4. The system of claim 3 wherein the production-limiting equipment and the reactor are close coupled.

5. The system of claim 1 wherein the multivariable predictive optimizer controller employs a mathematical technique selected from the group consisting of neural networks, partial least squares, principle component regression or first principles models to infer impending changes of reactor state variables.

6. The system of claim 1 wherein at least one of the multivariable predictive optimizer controllers is non-linear.

7. The system of claim 1 wherein the system is used to control a chemical manufacturing process comprising a polyolefin reactor and an extruder, wherein the extruder is located downstream of the reactor, and wherein the extruder is production-limiting equipment.

8. The system of claim 7 wherein the reactor and the extruder are close coupled.

9. The system of claim 7 wherein the polyolefin reactor is used to manufacture a polyolefin selected from the group consisting of polymers comprising at least fifty weight percent polypropylene and polymers comprising at least fifty weight percent polyethylene.

10. A system for controlling a chemical manufacturing process having at least one chemical reactor and production limiting factor located upstream or downstream from the reactor, comprising: a first multivariable predictive optimizer controller for optimizing control of the chemical reactor; and a second multivariable predictive optimizer controller operating hierarchically above the first controller and the production limiting factor for providing integrated process control of the reactor and the production limiting equipment.

11. The system of claim 10 further including a third multivariable predictive optimizer controller operating hierarchically below the second controller for controlling the production limiting factor.

12. The system of claim 10 wherein the production limiting factor is production limiting equipment located downstream from the reactor.

13. The system of claim 12 wherein the production limiting equipment and the reactor are close coupled.

14. The system of claim 10 wherein the multivariable predictive optimizer controller employs a mathematical technique selected from the group consisting of neural networks, partial least squares, principle, component regression or first principles models to infer impending changes of reactor stats variables.

15. The system of claim 10 wherein at least one of the multivariable predictive optimizer controllers is non-linear.

* * * * *